(12) United States Patent
Scott

(10) Patent No.: US 11,138,900 B1
(45) Date of Patent: Oct. 5, 2021

(54) APPARATUS, SYSTEM AND METHOD FOR VIOLIN AND VIOLA VIBRATO TRAINING

(71) Applicant: Laurie P. Scott, Austin, TX (US)

(72) Inventor: Laurie P. Scott, Austin, TX (US)

(*) Notice: Subject to any disclaimer, the term of this patent is extended or adjusted under 35 U.S.C. 154(b) by 0 days.

(21) Appl. No.: 17/088,830

(22) Filed: Nov. 4, 2020

Related U.S. Application Data

(60) Provisional application No. 62/908,811, filed on Oct. 1, 2019.

(51) Int. Cl.
*G09B 15/06* (2006.01)
*G10G 7/00* (2006.01)

(52) U.S. Cl.
CPC ............. *G09B 15/06* (2013.01); *G10G 7/00* (2013.01)

(58) Field of Classification Search
CPC .................................. G09B 15/06; G10G 7/00
See application file for complete search history.

(56) References Cited

U.S. PATENT DOCUMENTS

| | | | | |
|---|---|---|---|---|
| 542,278 A | * | 7/1895 | Petermann | G10D 3/18 84/281 |
| 776,434 A | * | 11/1904 | Smith | G10D 3/18 84/281 |
| 896,721 A | * | 8/1908 | Goldenberg | G10D 3/18 84/281 |
| 1,271,460 A | * | 7/1918 | Handel | G10D 3/18 84/281 |
| 1,740,824 A | * | 12/1929 | Von Linprun | G10D 3/18 84/281 |
| 1,753,006 A | * | 4/1930 | Haaf | G10D 3/18 84/328 |
| 1,764,162 A | * | 6/1930 | Glucksman | G10D 3/18 84/281 |
| 1,824,901 A | * | 9/1931 | Kessler | G10D 3/18 84/281 |
| 1,886,070 A | * | 11/1932 | Weber | G10D 3/00 84/281 |
| 1,906,584 A | * | 5/1933 | Hays | G10D 3/18 84/281 |
| 2,056,819 A | * | 10/1936 | Bodee | G10D 3/18 84/281 |
| 2,240,696 A | * | 5/1941 | Gusman | G09B 15/06 84/281 |
| 2,761,346 A | * | 9/1956 | Kuchler | G10D 3/18 84/281 |
| 3,619,470 A | * | 11/1971 | Harris | G09B 15/06 84/281 |

(Continued)

OTHER PUBLICATIONS

Wrist Assistant 2016 https://www.etsy.com/listing/119534764/wrist-assistant?gpla=1&gao=1&&utm_source=google&utm_medium=cpc&utm_campaign=shopping_us_e-books_movies_and_music-music-musical_instruments-other&utm_custom1=_k_EAIaIQobChMIsKu3xfmS8gIVCLblCh0XrQg9EAQYASABEgl5gfD_BwE_k_&utm_content=go_1843970761.*

*Primary Examiner* — Robert W Horn
(74) *Attorney, Agent, or Firm* — Zagorin Cave LLP; Robert W. Holland

(57) ABSTRACT

A vibrato training tool aids positioning of a violinist's or violist's hand to a location where the player can perform vibrato with support so that the technique is learned more efficiently. For instance, the student wears a glove having a spacer coupled to it that aligns to rest against a bout of the violin so that the fingers can practice the vibrato movement while the student's wrist is supported against the violin or viola body, such as at the bout. An oscillation indicator swings freely relative to the glove to provide a visual indication of the vibrato motion.

20 Claims, 4 Drawing Sheets

(56) References Cited

U.S. PATENT DOCUMENTS

| | | | | |
|---|---|---|---|---|
| 3,726,174 A * | 4/1973 | Kaplan | ................. | G09B 15/06 84/470 R |
| 3,726,176 A * | 4/1973 | Kaplan | ................. | G09B 15/06 84/470 R |
| 3,839,938 A * | 10/1974 | Williams | ............... | G09B 15/06 84/465 |
| 7,615,698 B2 * | 11/2009 | Woodhouse | ............ | G10D 3/00 84/281 |
| 7,897,857 B2 * | 3/2011 | Lockwood | ............ | G09B 15/06 84/280 |
| 8,829,317 B1 * | 9/2014 | Linquist | .................. | G10D 3/18 84/281 |
| 8,969,691 B1 * | 3/2015 | Reynolds | ................ | G10D 3/18 84/281 |
| 9,489,930 B1 * | 11/2016 | Linquist | .................. | G10D 3/18 |
| 2008/0271585 A1 * | 11/2008 | Jones | .................... | G09B 15/06 84/281 |
| 2021/0225193 A1 * | 7/2021 | Barosso | .................. | G10D 1/02 |

* cited by examiner

APPARATUS, SYSTEM AND METHOD FOR VIOLIN AND VIOLA VIBRATO TRAINING

CROSS-REFERENCE TO RELATED APPLICATION(S)

This application claims the benefit of provisional application No. 62/908,811, filed Oct. 1, 2019, entitled "Apparatus, System and Method for Violin and Viola Vibrato Training", naming Laurie Scott as inventor, which application is incorporated herein by reference in its entirety.

BACKGROUND OF THE INVENTION

Field of the Invention

The present invention relates in general to the field of stringed instrument instruction, and more particularly to an apparatus, system and method for violin and viola vibrato training.

Description of the Related Art

Stringed instruments vibrate a string to generate sound. Instruments considered as orchestral stringed instruments, violin, viola, cello, and bass, generate vibration on the string by plucking the string, (pizzicato), or through the use of a bow (arco). This apparatus is specifically designed for use with the violin or viola. As with other stringed instruments, four strings of different thickness are stretched under tension between two nodal points, the nut (a small piece of wood near the tuning pegs of the instrument that supports and separates the strings) and the bridge, (an arched piece of wood held in place by the tension of the strings to separate and hold strings at a pitched tension) to generate notes on a violin or viola. The bow is pulled across each string with the contact of the bow hair placed on the strings between the bridge and fingerboard.

Inside the instrument is a small dowel of wood (sound post) placed under the leg of the bridge that transfers vibrations between the top and back surfaces of the instrument originating from the resonating hollow cavity of the instrument. There is also an elongated piece of wood attached to the underside of the top surface glued under the lowest pitched string (bass bar). There are sound holes on the top surface of the instrument that allow the resonating sound from the vibrating strings to be directed outwards.

Between the violin main body and scroll (the end of the violin that holds the tuning pegs in place), a tapered piece of wood called the neck supports a fingerboard with the strings suspended above the surface of the fingerboard. A performer produces different notes by placing a finger on the string and sinking the weight of the finger onto the string and depressing the string against the fingerboard, thus effectively changing the length of the vibrating string and, accordingly, the pitch of the note. Violinists and violists learn to produce notes that are considered "in tune" by slightly adjusting their finger position and by listening to the sound that is produced by the string vibration.

Individuals learn to play stringed instruments at many different ages, some beginning as young as age 3, and others deciding to begin study at an advanced age. The challenge of learning to play violin or viola is conquered by gradually building from basic skills to the complex mastery of artist level technique. In addition to the techniques required by the left hand, students learn to hold the bow and move it in a linear fashion to produce sound with good tone. Bow weight and speed adjust not only the tone but the volume of the sound. The student must simultaneously concentrate on disassociating the movements of the bow arm and left hand while maintaining the position of the instrument in a way that allows a consistent kinesthetic approach to the instrument. Arm motions, finger placement, and bow movement can create a wide variety of tonal variation. In the case of young students, the consistency of technical improvement is also affected by overall growth, specifically arm length, as they grow and adjust to different sized instruments. No matter the age or skill level of the performer, dedicated attention to aspects of posture that foster habituation of correct technique allows the most consistent progress in skill.

Production of a pitched note other than that produced by an open string requires the placement of the finger on a string. The finger depresses the string against the fingerboard in a specified place on the fingerboard to produce a constant pitched tone. For the beginning level performer, playing with a consistently correct intonation, known as playing in tune, presents a challenge that can persist for years as habits related to posture and tone are solidified. As a student progresses, they typically want to add vibrato, a variation of the pitch for aesthetic effect, to their skill set as it is a technique that adds color, expression, and individuality to each performers musical voice. The technique of using vibrato on a stringed instrument is considered an irreducible component of advanced artistry. The requisite skills for vibrato are typically prepared years in advance as teachers help students achieve a standard of intonation and tone mastery which establishes a foundation for this more advanced skill. Skilled performers are expected to be able to execute this technique while the fingers are utilized in any area of the fingerboard. When the player's arm motion allows the left hand to move and depress the fingers in different areas of the fingerboard, the pitches of the string, as it is shortened or lengthened through depressing the fingers in different places, produces different pitched tones. Each area of the fingerboard accessible to the fingers without further arm adjustment is designated as a position. When the hand is furthest from the body of the violin itself and closest to the scroll, and the depressing of the first finger produces a pitch one whole step in tone above the open string, this position is designated as the first position. As the arm motion allows the hand to move closer to the body of the instrument, positions are designated with ascending numbers i.e., second position, third position and so on into the upper positions. Most pedagogues do not indicate position markings or fingerings beyond the eighth position although performers may utilize notes in positions beyond that designation. Students in the formative stage of technical development, a stage that typically includes vibrato study, would most likely not be performing repertoire requiring performance in positions past the fourth or fifth position on the violin or viola.

Vibrato is a variation of the pitch as the finger oscillates on either side of a base note. During vibrato motion, the points of contact for the left hand are reduced to involve only the thumb and the finger that is actually making the vibrato motion on the fingerboard. During the initial stages of vibrato study students often have difficulty achieving the balance of the hand and accomplishing an even and controlled vibrato motion.

SUMMARY OF THE INVENTION

Therefore, a need has arisen for a system and method which provides an aid for vibrato study to help a student achieve a balance of the hand and even, controlled vibrato motion.

In accordance with the present invention, a system and method are provided which substantially reduce the disadvantages and problems associated with previous methods and systems for aiding student vibrato study. A spacer couples to a student's left hand to provide support for training the hand balance during wrist and arm motion to perform vibrato.

More specifically, the present apparatus assists students in attaining an artistic vibrato by enhancing support of the left hand as balance and points of contact are reduced when the contact of the base knuckle of the first finger is released from the side of the fingerboard. The tool assists the student by creating a kinesthetic support to help train hand balance during wrist and arm oscillations required during the vibrato motion. The tool attaches to the student's left wrist and functions as a cushion against the shoulder (bout) of the instrument for support of the oscillating wrist and arm motion. In one example embodiment, the tool attaches to a student as a glove that slips over the student's wrist and is held from moving relative to the wrist with the student's thumb through a thumb opening. During practice of vibrato technique, the student's wrist is held in desired distances from the bout by a spacer coupled to the glove and aligned to rest against the bout. An oscillation indicator, such as faux animal tail, hangs from the glove to provide to the student a visual indication of the rhythmic quality of the student's vibrato motion. This focus on the goal of even oscillations, rather than a focus on the details of the physical execution of the motion, can be helpful in achieving a more natural motion.

The present invention provides a number of important technical advantages. One example of an important technical advantage is that student flexibility can be enhanced in all joints of the left hand and arm as the tool's additional support creates a feeling of security achieved by filling the space between the instrument and the wrist. Students can transition from upper positions, in which the bout or shoulder of the instrument isolates wrist motion, to lower positions in which the thumb and finger are the only two points of contact with the neck of the instrument. As the student obtains a feel for the vibrato, the training aid may be removed to practice without support so that the student builds confidence in using vibrato technique in repertoire while maintaining a balanced posture, solid tone and consistent intonation.

BRIEF DESCRIPTION OF THE DRAWINGS

The present invention may be better understood, and its numerous objects, features and advantages made apparent to those skilled in the art, by referencing the accompanying drawings. The use of the same reference number throughout the several figures designates a like or similar element.

DETAILED DESCRIPTION

The vibrato tool as depicted in the figures, holds a support against a violin bout to aid a student in gaining comfort performing the vibrato technique. For example, the support may be a piece of firm Styrofoam tube or similar firm cushioning material that provides a firm rest against the violin body. In the example embodiment, the support is tucked into a pocket formed in a glove worn by the student, however, other embodiments may couple the support to the student in an alternative manner with alternative coupling devices, such as with a Velcro wrist band coupled to the support by an adhesive or mechanical attachment like a staple. As an alternative, the support may be made from a dense foam material, such as TempurPedic foam, by cutting the dense foam support from a piece of foam similar to those used as shoulder rests that are placed between the violin and the musician's shoulder. The dense foam, as compared with Styrofoam, molds not only to the bout of the instrument but also to the shape of the wrist, to allow use by different sized students. To adapt to different violin positions and different violin sizes, the tool may include a set of plural spacers of different sizes that a student may select for use. In one example embodiment, variable sized spacers can be joined or attached utilizing one coupling device, such as one glove, as students experience the vibrato motion in different positions on the fingerboard. The tool can be used for larger instruments, such as a viola, or for students that want a stronger physical suggestion for training purposes.

In various embodiments, the vibrato aid comes in different sizes to accommodate different sized instruments, such as violins that can vary from $1/16$, $1/8$, $1/4$, $1/2$, and $3/4$ to full size, or violas that also come in size variations. The spacer may be shaped to form against the violin neck for novice learners or have a more minimalist form as the student advances. One embodiment comes with pre-cut sizes that a user can assemble to change the size of the tool for different students or students at varying stages of skill development. Similar but larger sizes may be used for the viola. One example embodiment embeds a practice counter to help the student track practice repetitions, or a timer to time practice attempts. The tool may also include visual cues to indicate note amplitude as an aid to finger placement and pitch variation during vibrato practice. This would allow the opportunity for the student to match control of speed and amplitude for each finger in different positions and on different strings of the instrument. The acquisition of this level of comprehensive control of vibrato is the goal of performers seeking a palate of expressive possibility in their approach to musical interpretation. The example embodiment described below with respect to FIGS. 1-6 provides a glove solution that readily couples to a student hand and different sized spacers as a convenient teaching tool.

Figure 1:
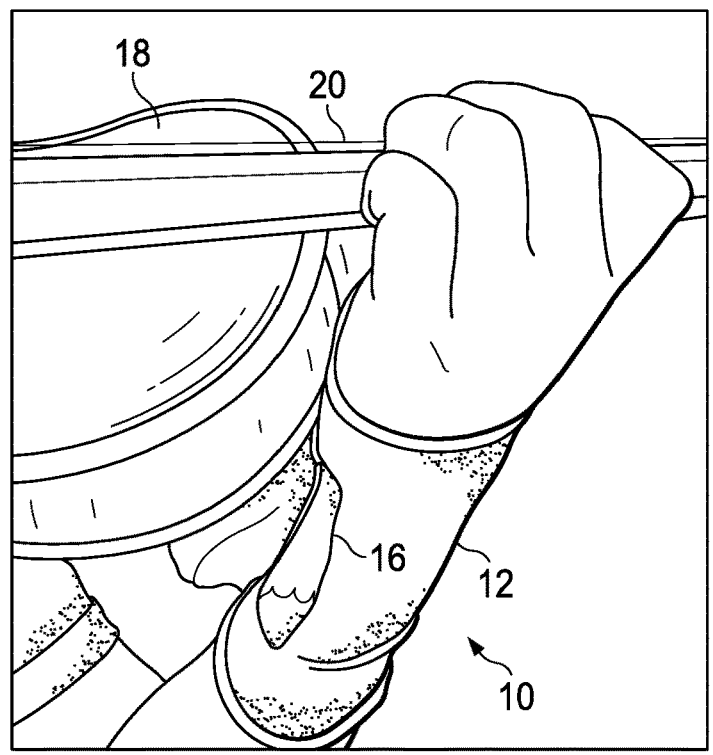
FIG. 1 depicts a vibrato tool on a student wrist holding a violin or viola in fourth position.

Referring now to FIG. 1, a vibrato tool 10 is depicted on a student wrist while the student holds a violin 18 (or viola) with their hand in the fourth position. The fourth position places the student's wrist and the base of the palm, generally referred to as the wrist area, against the bout or shoulder of the main violin body where the student's fingers can depress strings 20 to play higher pitched notes associated with string vibration at a short length. In the initial stages of learning the vibrato motion, vibrato is typically better executed through use of the second or third finger of the left hand on the fingerboard. In the fourth position, the student can perform the vibrato motion by oscillating the wrist slightly, causing the first joint of the finger placed on the strings to flex, resulting in an altered pitch. In this position, the wrist area is supported directly against violin 18 at the bout as shown in FIG. 1. Because the bout of the violin stabilizes the wrist, no spacer is required between the wrist and bout in this position. In the example embodiment, a spacer (labeled as 14 in FIG. 2 but hidden below the body of violin 18 in FIG. 1) is fit into a glove 12 (as described in greater detail below) and then slid under the body of violin 18 instead of against the bout. In an alternative embodiment, the spacer may be removed from glove 12 while practicing vibrato in fourth position. FIG. 1 depicts vibrato tool 10 coupled to a student wrist in the form of a glove 12 having a single large finger opening through which all four fingers fit so that the student may interact with strings 20 in a normal manner to play notes with all four fingers. A spacer (out of sight as shown but designated as 14 below where shown) couples to glove 12 but, in the depicted fourth position, spacer 14 fits under the body of violin 18 so as not to impede the end user interactions with strings 20.

An oscillation indicator 16 hangs off of glove 12 and within sight of the student. In the example embodiment, oscillation indicator 16 has the appearance of a fox tail, although other animal tails or other artistic and fun appearances may be used. The fox tail helps to make the vibrato training of greater interest to younger students. In various embodiments, oscillation indicator 16 may having varying lengths and widths to adjust the oscillation response to a vibrato motion and the visibility to the player. For instance, a configurable weight may be adjusted by adding and removing weights at the tail. When glove 12 is worn without a spacer, oscillation indicator 16 provides a valuable training reference to the player even though the spacer itself is not needed to play vibrato, such as in the depicted fourth position. An advantage of using a spacer in fourth position is that the player has the spacer available if the hand moves to another position on the fingerboard that is further from the bout than fourth position. For instance, the player performs vibrato with the spacer under the violin body in fourth position and then slides to third position to expose the support from under the violin and place it against the bout as described below.

Figure 2:
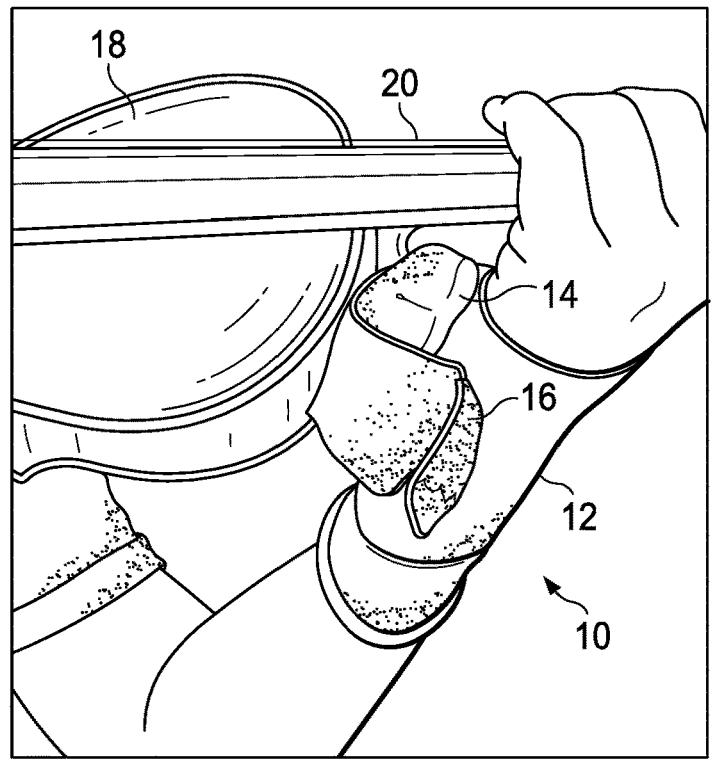
FIG. 2 depicts the vibrato tool on the student wrist holding the violin or viola in third position supported by the tool spacer resting against a bout of the violin or viola.

Referring now to FIG. 2, the vibrato tool 10 is depicted on the student wrist while the student holds the violin 18 (or viola) in a third position supported by the tool spacer 14 resting against a bout of the violin 18 (or viola). The third position provides the student with a range of finger touch locations that are further from the body of violin 18 than those of the fourth position so that notes played will have a lower pitch than those of the fourth position. In the third position, the student's arm slides down the violin neck and away from the body where the wrist area is out of contact with the bout of violin 18. To provide the student with support that aids in performance of the vibrato technique, the student rests spacer 14 against the bout of violin 18. Spacer 14 is aligned by glove 12 to press against violin 18 at the bout when the student performs the vibrato motion. When not playing with vibrato, spacer 14 does not interfere with the student's normal playing technique in the third position. Under different conditions, the size and shape of spacer 14 may vary to achieve support at the bout of violin 18. For instance, smaller sized violins may have a minimal-sized spacer since the distance between the fourth and third position is less than with larger sized violins, which would require a larger spacer. In addition, the shape of spacer 14 may vary based upon conditions so that the same glove 12 will align spacer 14 at the bout even where the relative orientation of the wrist may change.

Figure 3:
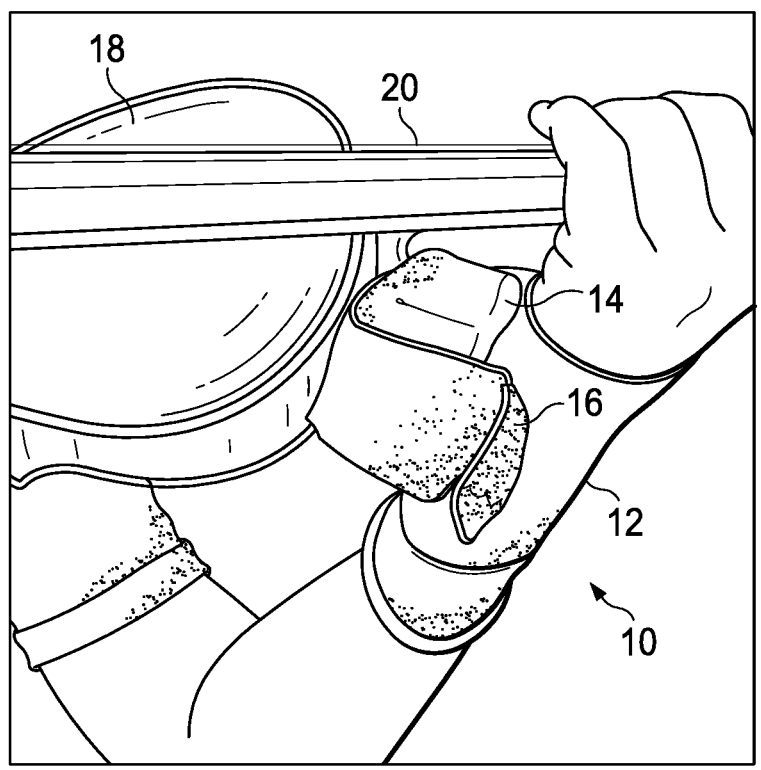
FIG. 3 depicts the vibrato tool on the student wrist holding the violin or viola in first position supported by the tool spacer resting against a bout of the violin or viola.

Referring now to FIG. 3, the vibrato tool 10 is depicted on the student wrist while the student holds violin 18 (or viola) in the first position supported by the tool spacer 14 resting against a bout of the violin or viola. In the first position, the student slides the wrist back to the distal end of the neck so that the fingers press against strings 20 in the lower pitch area relative to the third and fourth positions. When playing the first position, spacer 14 is a larger size to fill the void between the wrist and the bout of the violin and to provide support against the bout of violin 18. In one embodiment, when working on vibrato in the first position the student couples a spacer 14 to glove 12 that accommodates the desired spacing. As an alternative, plural spacers 14 may be cooperatively coupled to glove 12 as needed to obtain the desired spacing to provide support against the bout of violin 18 when the student is practicing vibrato in first position. For example, each spacer 14 may include a piece of Velcro or other tactile coupling device to provide a cumulative spacer of a desired thickness.

Figure 4:
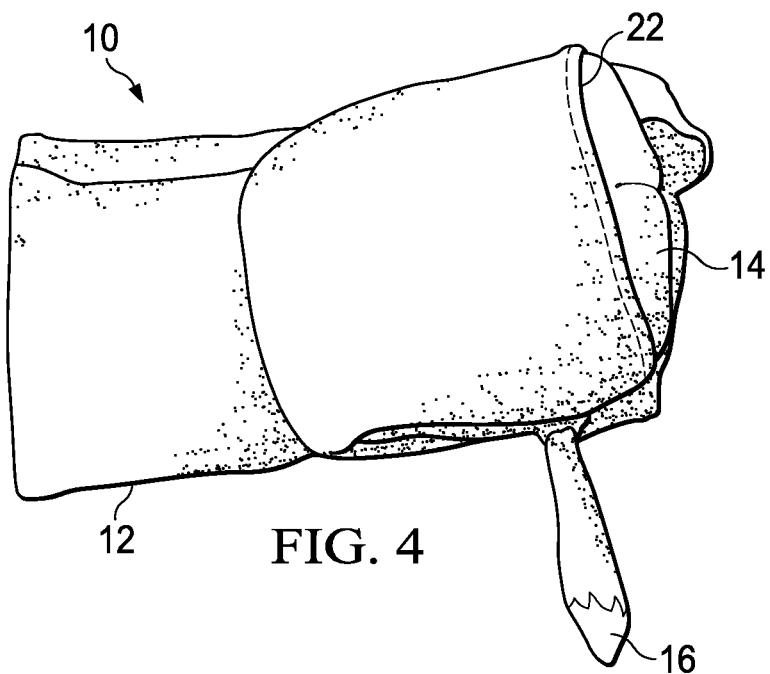
FIG. 4 depicts the vibrato tool with a support coupled to it and prepared to insert around a student wrist.

Referring now to FIG. 4, vibrato tool 10 is depicted with a spacer 14 coupled to it and prepared to be attached around a student's wrist. In the example embodiment, spacer 14 inserts into a pocket 22 formed in glove 12 and is held in place by compression of the pocket 22 around spacer 14. For example, compression is provided by an elastic material integrated in pocket 22. Alternatively, pocket 22 is a flap that closes over spacer 14 and is held at different positions with different compressions by Velcro or other fastening material. In one alternative embodiment, oscillation indicator 16 may also be selectively attached and detached to allow the student to remove the tail if desired, as well as to move the location of the tail where needed for better viewing or rhythmic response. In one example embodiment, oscillation indicator 16 may couple to spacer 14 so that each spacer 14 has an oscillation indicator 16 specific to its size and/or shape for ease of identity. For instance, different sized spacers 14 may have different color or animal types for the oscillation indicator that attaches. In such an embodiment, the oscillation indicator may fit through an opening of the glove at coupling of the support to the glove or otherwise be located at an exposed portion of the support after the support couples to the glove.

Figure 5:
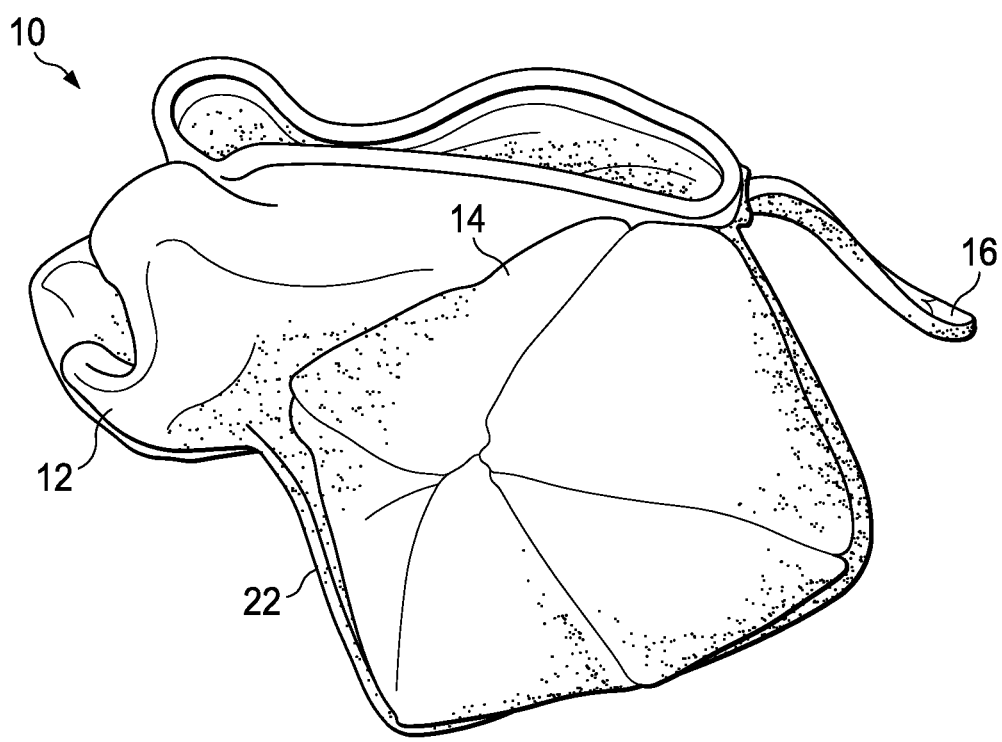
FIG. 5 depicts the vibrato tool having an open pocket to accept a support.

Referring now to FIG. 5, vibrato tool 10 is depicted having an open pocket 22 to accept a support 14. Pocket 22 folds back at a flap to provide access for insertion of support 14 into the pocket area. Spacer 14 may be removed and replaced with an alternative spacer of different size or shape as desired for configuration of vibrato tool 10.

Figure 6:
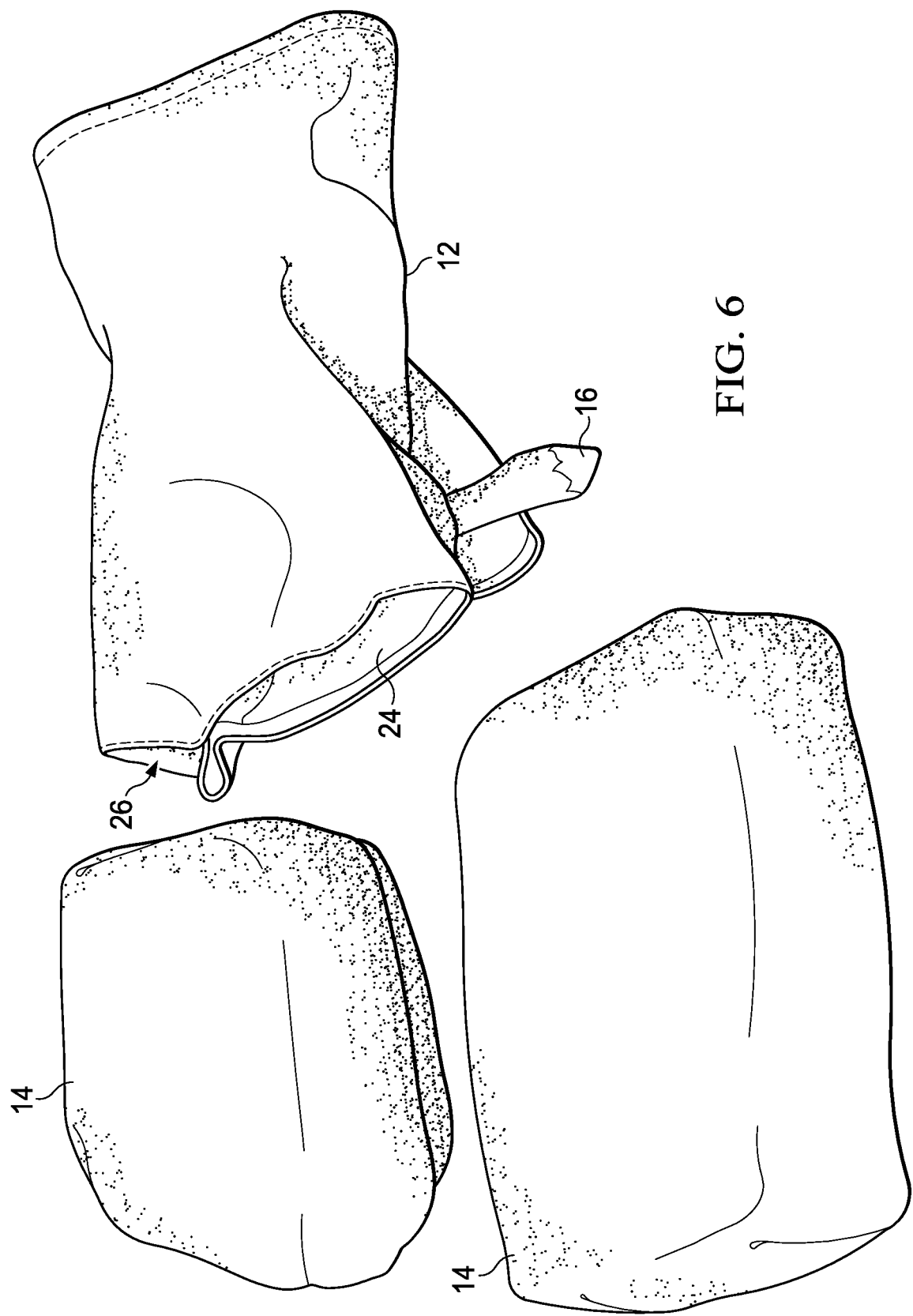
FIG. 6 depicts the vibrato tool disassembled with first and second selectable supports that couple to the tool pocket to support different violin or viola sizes and/or different playing positions.

Referring now to FIG. 6, vibrato tool 10 is depicted disassembled with first and second selectable supports 14 that couple to vibrato tool 10 with pocket 22 to support different violin or viola sizes and/or different playing positions. Glove 12 has a finger opening 24 and a thumb opening 26. Finger opening 22 allows all of the student's fingers to pass through so that the student can press on violin strings without interference. Thumb opening 22 accepts the student thumb and offers a more tight fit so that vibrato tool 10 will remain in desire position on the student's wrist during playing of the violin.

Although the present invention has been described in detail, it should be understood that various changes, substitutions and alterations can be made hereto without departing from the spirit and scope of the invention as defined by the appended claims.

What is claimed is:

1. A stringed instrument training tool comprising:
   a glove sized to fit on a left hand, the glove having a pocket aligned when worn on the left hand with a wrist area; and
   a spacer sized to fit in the pocket and align against the stringed instrument to provide a support of a predetermined distance between a body of the stringed instrument and the glove, the predetermined distance associated with vibrato practice on the stringed instrument.

2. The stringed instrument training tool of claim 1 further comprising:
   an oscillation indicator extending from the glove;
   wherein the oscillation indicator is configured to move rhythmically in response to even vibrato oscillations.

3. The stringed instrument training tool of claim 2 wherein the oscillation indicator has the shape of an animal tail.

4. The stringed instrument training tool of claim 2 wherein the oscillation indicator is configured to accept weights that adjust the rhythm of movement during the vibrato oscillations.

5. The stringed instrument training tool of claim 1 further comprising at least a first and a second spacer, the first spacer sized to fit in the pocket to provide a first predetermined distance associated with a first stringed instrument size, the second space sized to fit in the pocket to provide a second predetermined distance associated with a second stringed instrument size.

6. The stringed instrument training tool of claim 1 further comprising at least a first and second spacer, the first spacer sized to fit in the pocket to provide a first predetermined distance associated with a first position of the stringed instrument, the second spacer sized to fit in the pocket to provide a second predetermined distance associated with a second position of the stringed instrument.

7. The stringed instrument training tool of claim 1 wherein the spacer comprises Styrofoam.

8. The stringed instrument training tool of claim 1 wherein the spacer comprises dense foam.

9. The stringed instrument training tool of claim 8 wherein the glove has a first opening to accept an end user thumb and a second opening to accept all of the remaining digits of the hand in a single finger opening.

10. A method for training a student to do vibrato on a stringed instrument, the method comprising:
    coupling a first spacer to a glove;
    placing the glove on a hand of the student; and
    aligning the first spacer to rest against the stringed instrument to hold the glove at a first predetermined spacing from the stringed instrument, the first predetermined spacing associated with a first stage of learning vibrato motion.

11. The method of claim 10 further comprising:
    coupling an oscillation indicator to the glove; and
    moving the oscillation indicator during vibrato.

12. The method of claim 10 further comprising:
    de-coupling the first spacer from the glove;
    coupling a second spacer to the glove; and
    aligning the second spacer to rest against the stringed instrument to hold the glove at a second predetermined spacing from the stringed instrument, the second predetermined spacing associated with a second stage of learning vibrato motion.

13. The method of claim 10 further comprising:
    coupling a second spacer to the glove at the first spacer; and
    aligning the first and second spacers to rest as a unit against the stringed instrument to hold the glove at a second predetermined spacing from the stringed instrument, the second predetermined spacing associated with an intermediary stage of learning vibrato motion.

14. The method of claim 10 wherein the first spacer comprises Styrofoam.

15. The method of claim 10 wherein the first spacer comprises dense foam.

16. The method of claim 10 wherein the placing the glove on a hand of the student further comprises inserting a thumb of the hand in a thumb opening and inserting all fingers of the hand in a single finger opening.

17. A vibrato training tool comprising:
    a coupling device operable to couple to an end user hand and a spacer, the coupling device comprising a glove; and
    a first spacer operable to couple to the coupling device aligned to rest against a violin bout when the end user hand is placed in a third position to play with vibrato.

18. The vibrato training tool of claim 17 wherein the glove comprises a first opening through which a thumb of the end user hand inserts and a second opening through which all four fingers of the end user hand insert.

19. The vibrato training tool of claim 17 further comprising a second spacer operable to couple to the coupling device in the place of the first spacer and aligned to rest against the violin bout when the end user hand is placed in first position to play with vibrato.

20. The vibrato training tool of claim 17 further comprising a second spacer operable to couple to the coupling device in cooperation with the first spacer so that the first and second spacer align to rest against the violin bout when the end user hand is placed in a first position to play with vibrato.

* * * * *